United States Patent [19]

Boscaino

[11] 3,794,093

[45] Feb. 26, 1974

[54] PNEUMATIC TIRE

[76] Inventor: Lorenzo Boscaino, 1 Chestnut St., Norristown, Pa. 19401

[22] Filed: May 4, 1972

[21] Appl. No.: 250,322

[52] U.S. Cl. .............................. 152/208, 152/302
[51] Int. Cl. .......................................... B60c 19/00
[58] Field of Search ... 152/208, 211, 212, 225, 226, 152/302, 301, 329, 327, 328, 152

[56] References Cited
UNITED STATES PATENTS
3,695,325  10/1972  Schuman .......................... 152/225

FOREIGN PATENTS OR APPLICATIONS
670,942  8/1961  Italy .................................. 152/226

Primary Examiner—James B. Marbert
Attorney, Agent, or Firm—Charles A. McClure

[57] ABSTRACT

A pneumatic tire for a vehicle is provided with a pressurizable inner casing having luglike members on the peripheral surface thereof, and a non-pressurizable outer casing having openings through the peripheral portion thereof and adapted to fit over the inner casing, with the luglike members of the inner casing fitting through the openings and normally protruding beyond the outer surface of the outer casing but depressible flush therewith when the members meet the roadbed by the normal pressure due to the weight of the vehicle. The resulting multi-purpose tire is advantageous for use on dry roads as well as slippery roads.

15 Claims, 7 Drawing Figures

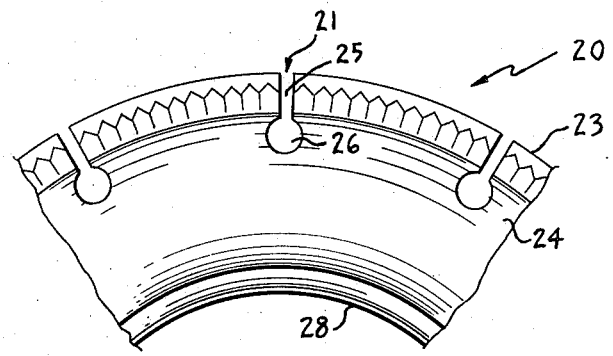
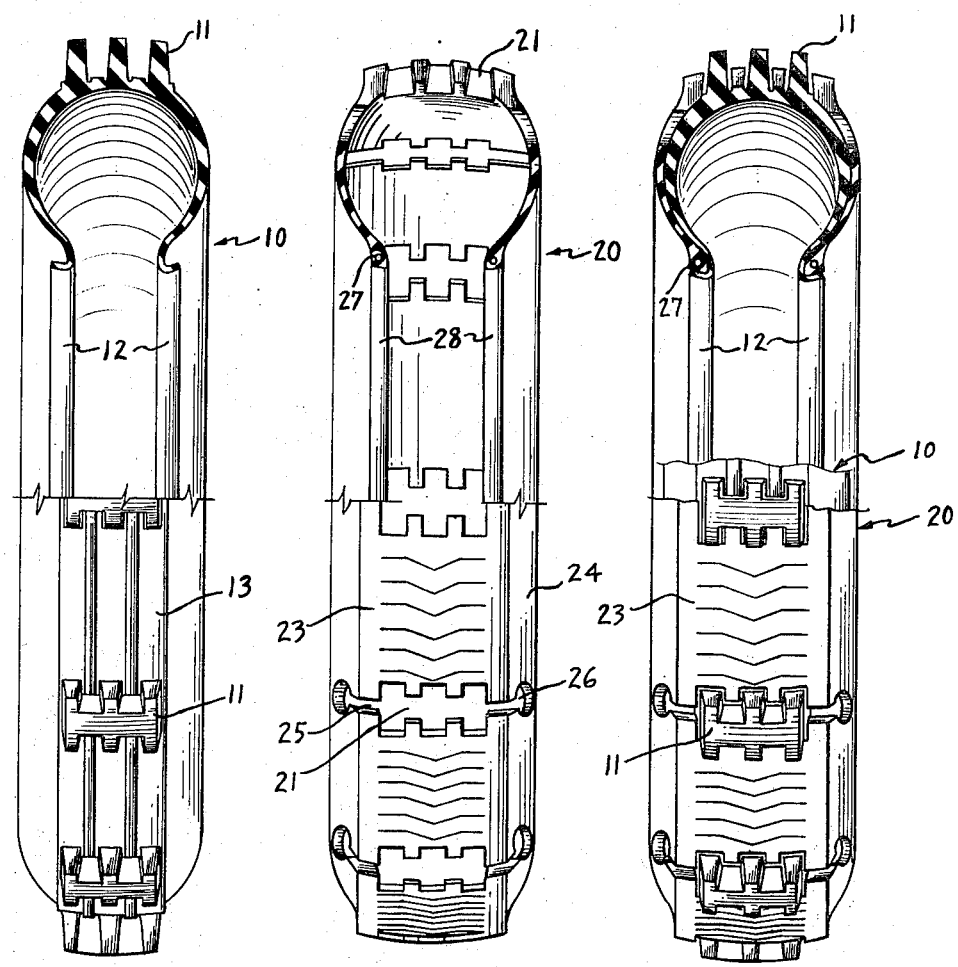
FIG. 3.
FIG. 1.   FIG. 2.   FIG. 4.

PNEUMATIC TIRE

This invention relates to pneumatic tires for vehicles, particularly such tires for use under difficult conditions of traction, such as in mud or snow or on ice or other surface having a reduced coefficient of friction.

There have been numerous efforts to provide tires having features especially useful on a slippery roadbed, as by providing raised tread portions. In some instances such tread portions have been designed with an alternative retracted position for use on dry roads to prevent excessive wear. However, such designs have not lived up to expectations, and there is a considerable need for an improved multi-purpose tire construction.

A primary object of the present invention is simplified construction of a tire especailly useful in mud or snow or on ice or other low-friction surface.

Another object is a tire construction useful on dry as well as slippery roads.

A further object is provision of a pneumatic tire having means for augmenting localized expansion of the portion thereof in contact with the roadbed as the tire rotates.

Other objects of this invention, together with means and methods for attaining the various objects, will be apparent from the following description and the accompanying diagrams.

FIG. 1 is an end or edge view, with the lower part in elevation and the upper part quarter-sectioned, showing an inner casing according to the present invention;

FIG. 2 is a like view of an outer casing according to this invention;

FIG. 3 is a fragmentary side elevation of the outer casing of FIG. 2; and

FIG. 4 is a view similar to FIGS. 1 and 2 showing the outer casing assembled over the inner casing according to the invention.

Figure 5:
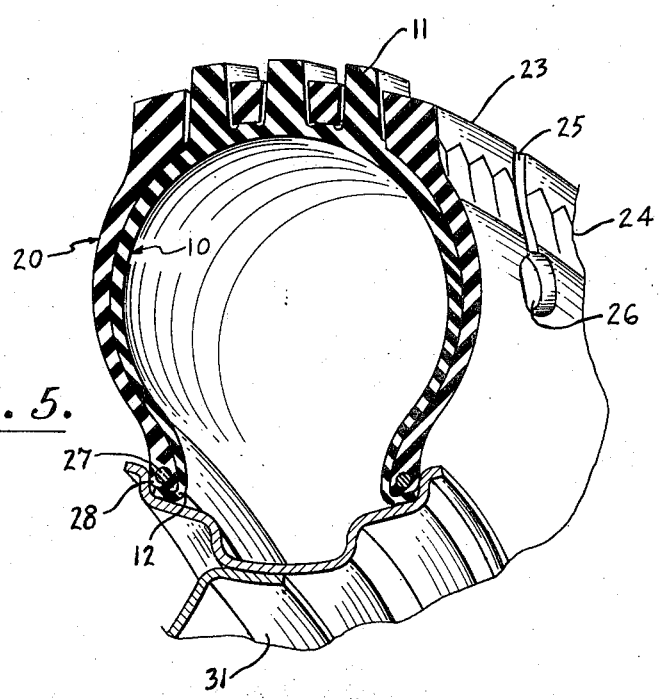
FIG. 5 is a fragmentary perspective view, on an enlarged scale and with transverse sectioning, of the assembled casings of the last previous view further assembled onto a rim.

In general, the objects of the present invention are accomplished, in a vehicle tire, by the combination of a pressurizable inner casing having luglike members protruding from the peripheral surface thereof, and an outer casing fitting over the inner casing and having openings in the peripheral portion thereof through which the luglike members protrude beyond the peripheral surface of the outer casing.

FIG. 1 shows inner casing 10, which is pressurizable when installed on a rim in "tubeless" tire manner. Protruding luglike members 11 are spaced at regular intervals (shown here as 30°) about otherwise smooth peripheral surface 13 of the casing. As shown, each lug has a linked double-H shape (HH) in plan and in radial section has an E-shaped transverse cross-section, with the body of the E at the casing body and the arms of the E extending radially from the axis of rotation. The axis itself is not denoted but extends horizontally through the center of the casing and constitutes the vertex of quarter-sectioning away of the upper forward quadrant in this view. Beadless inner edge portions 12 of the casing curl outward to present surfaces suitable for engaging a conventional wheel rim, as shown in a subsequent view.

FIG. 2 shows outer casing 20 in a view like that in which the inner casing was just shown, and FIG. 3 shows the outer casing fragmentarily from the side. This inner casing has openings 21 therethrough spaced at regular intervals about its peripheral portion. The openings are spaced and configured similarly to the luglike members on the inner casing of FIG. 1. Viewed from the side the openings have a keyhole appearance, with slotlike part 25 thereof segmenting tread portion 23 of the outer casing and with circular part 26 thereof extending into sidewall portion 24 of the casing. Bead portion 28 with wire bead 27 therein is conventionally located and shaped.

FIG. 4 shows outer casing 20 assembled over inner casing 10, with luglike members 11 of the inner casing protruding through openings 21 in the outer casing and beyond tread portion 23 of the latter. Bead portions 28 of the outer casing are covered by beadless inner edge portions 12 of the inner casing, as shown where the upper forward quadrant is sectioned away similarly to FIGS. 1 and 2.

Figure 6:
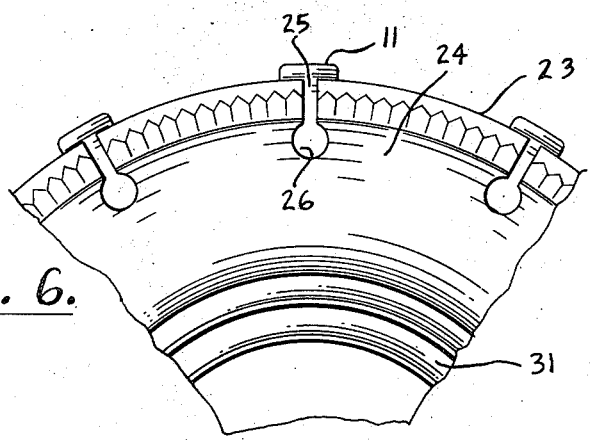
FIG. 6 is a fragmentary side elevation of the assembly of FIG. 5 on a reduced scale.
Figure 7:
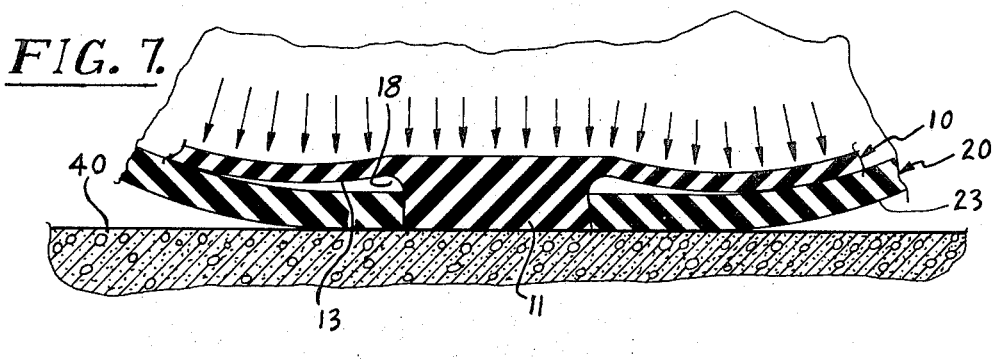
FIG. 7 is a fragmentary side sectional elevation of the same assembly showing the portion in contact with the roadbed.

The tire, made up of assembled outer and inner casings of FIG. 4, is shown mounted on rim 30 of conventional wheel 31 (shown fragmentarily) in the next two views: FIG. 5 in sectional perspective (on an enlarged scale), and FIG. 6 in side elevation. Operation of the tire is readily understood with the aid of a side sectional elevation of the portion in contact with roadbed 40, as shown on an enlarged scale in FIG. 7, in which arrows indicate pressure of the confined air acting outwardly against the inner wall of inner casing 10.

It will be apparent that tread portion 23 of the outer casing rolls along in contact with the underlying pavement or other roadbed and that when any luglike member 11 of the inner casing comes into contact with the roadbed it is depressed upwardly and inwardly until flush with the tread-like portion. Such depression of such originally protruding luglike member retracts the surrounding portion of the outer surface of the inner casing from the inner surface of the outer casing, as at 18 in FIG. 7. The resulting reduction in inner casing volume in the immediate vicinity of the depressed luglike member and accompanying air pressure increase tends to bulge the tire outward therearound where the respective casings remain in mutual contact, with increase in effectiveness of the contact between tire and roadbed.

Such structure and functioning should be contrasted with features of conventional mud or snow tires, in which the objective has been to superimpose luglike members on the tread portion of an outer casing, and of tires with protruding metal studs for use on ice. While the present invention is not to be limited to any theory of functioning, it seems that no fixably protruding member could provide the effect of depressibly protruding members. A possible explanation of the efficacy of the tire of this invention is not only that localized enlargement of the tire "footprint" occurs on the roadbed but also that it does so with a repetition frequency or "pulsation" dependent upon the peripheral spacing of the protruding members and the speed of rotation of the tire.

The tire of this invention is economical to construct, easy to assemble and mount (and dismount or disassemble), being made of relatively thin lightweight components, which together may total less than the weight of a conventional high-traction tire. It is also economical to use because the luglike members are not subject to the severe wear to which the luglike tread of a conventional mud or snow tire is subjected, and in addition the inner casing can be replaced separately from the outer casing (and vice versa, of course) so that wear or accidental cuts or damage to one will not necessitate discarding of the entire tire. The materials of construction are compltely conventional, of course, and conventional molding methods are readily adapted to producing the casings of the tire without difficulty.

Although a preferred embodiment has been disclosed by way of example, the present invention is not to be limited thereto. Thus the inner casing, which is shown in "tubeless" form, may be made in toroidal "tube" form instead. The illustrated configuration of luglike members may be varied greatly and the spacing thereof be altered as desired. Other modifications, such as addition, combination, or subdivision of component parts, or substitution of equivalents, may be made while retaining significant advantages and benefits of the invention, which include enhanced safety of operation and consequent life-saving potential as well as utility, economy, and convenience. The invention itself is defined in the following claims.

The claimed invention:

1. In a vehicle tire, the combination of a pressurizable inner casing having luglike members protruding from the peripheral surface thereof, and an outer casing fitting over the inner casing and having openings in the peripheral portion thereof through which the luglike members protrude beyond the peripheral surface of the outer casing.

2. The tire of claim 1, wherein the luglike members have a tread-like outline in plan view.

3. The tire of claim 2, wherein the openings through which the luglike members protrude have a configuration complementary therewith.

4. The tire of claim 1, wherein the sidewalls of the outer casing are relieved at intervals therearound by openings therein, and the tread portion is segmented thereby.

5. The tire of claim 4, wherein the sidewall openings are keyhole-shaped in transverse view, with the circular part thereof in the sidewalls and the keyhole-slotted part thereof extending to the peripheral surface.

6. The tire of claim 4, wherein the sidewall openings adjoin and intersect with the openings in the peripheral portion of the casing.

7. In a vehicle tire having a pressurizable inner casing and an outer casing thereover, the improvement comprising a plurality of luglike members secured to and extending outwardly from the peripheral surface of the inner casing through and beyond openings therefor in the outer casing.

8. The tire of claim 7, wherein the luglike members are spaced at regular intervals about the tire.

9. The tire of claim 7, wherein the inner casing is resilient in the vicinity of the luglike members so that they are depressed flush with the peripheral surface of the outer casing upon coming into weight-bearing contact with an underlying roadbed.

10. The tire of claim 9, wherein the outer casing is resilient in the vicinity of the openings therein so that the portion of the outer casing in contact with the roadbed increases when the adjacent luglike members are depressed upon contact with the roadbed.

11. In a vehicle tire having an outer casing with openings in the peripheral portion thereof, the improvement comprising a separate inner casing having luglike members adapted to protrude through and beyond such openings.

12. The tire of claim 11, wherein the inner casing is pressurizable.

13. In a vehicle tire having a pressurizable casing with luglike members extending therefrom at intervals about the peripheral surface thereof, the improvement comprising an outer casing adapted to fit thereover and having openings in the peripheral portion thereof accommodating such luglike members therethrough beyond the outer casing surface.

14. The tire of claim 13, mountable upon a conventional vehicle rim.

15. A vehicle tire comprising a pressurizable resilient inner casing having integral luglike tread members protruding radially on the peripheral surface thereof, a non-pressurizable resilient outer casing fitting over the inner casing and having openings therein through which the luglike members can protrude beyond the peripheral surface thereof, within which the protruding luglike members are depressed flush with the peripheral surface of the outer casing upon coming into weight-bearing contact with an underlying roadbed and subsequently protruding in the absence of such weight-bearing contact.

* * * * *